United States Patent [19]
Muselli et al.

[11] Patent Number: 5,303,788
[45] Date of Patent: Apr. 19, 1994

[54] ROBOTIC VEHICLE HAVING FLEXIBLE CHASSIS

[75] Inventors: Roberto Muselli, Piacenza; Armando Neri, Bologna; Gianluigi Orsi, Roveleto di Cadeo, all of Italy

[73] Assignees: Jobs S.p.A., Piacenza; G. D. S.p.A., Bologna, both of Italy

[21] Appl. No.: 827,371

[22] Filed: Jan. 29, 1992

[30] Foreign Application Priority Data

Feb. 12, 1991 [IT] Italy ............. PC 91 A 000003

[51] Int. Cl.[5] .................. B62D 57/00; B25J 5/00
[52] U.S. Cl. ......................... 180/7.1; 74/479 R;
  180/21; 180/22; 280/703; 280/781; 280/791;
  901/1; 901/21; 901/23
[58] Field of Search ............ 180/7.1, 167, 119, 21,
  180/22, 9.1, 9.32; 280/781, 782, 783, 791, 797,
  800, 703; 901/21, 23, 1; 74/479

[56] References Cited

U.S. PATENT DOCUMENTS

| | | | |
|---|---|---|---|
| 2,067,546 | 1/1937 | Rocher | 280/781 |
| 2,232,275 | 2/1941 | Ronning | 280/781 |
| 4,283,165 | 8/1981 | Vertut | 901/21 |
| 4,764,078 | 8/1988 | Neri | 901/1 |
| 5,054,332 | 10/1991 | Terauchi et al. | 901/21 |

FOREIGN PATENT DOCUMENTS

| | | | |
|---|---|---|---|
| 4203841 | 8/1992 | Fed. Rep. of Germany | 280/781 |
| 90809 | 4/1989 | Japan | 280/703 |

*Primary Examiner*—Mitchell J. Hill
*Attorney, Agent, or Firm*—Notaro & Michalos

[57] ABSTRACT

An automotive truck for moving a robot along a surface comprises a chassis and at least one platform hingedly connected to the chassis at one end of the platform. A drive wheel is rotatably mounted to the platform. A spring is connected at an opposite end of the platform pressing the drive wheel against the surface.

4 Claims, 5 Drawing Sheets

ROBOTIC VEHICLE HAVING FLEXIBLE CHASSIS

FIELD AND BACKGROUND OF THE INVENTION

The present invention relates to an automotive truck on which a robot is mounted, and is able to move around the workplace along pre-set routes in order to perform a number of repetitive operations with the precision typical of this kind of machine.

The robot, which is designed in such a way to reduce its size and increase the range of the movements generally possible for this kind of machine, is mounted on a automotive truck.

The result is a fully-automatic unit which moves along programmed routes, stopping to perform the required operations.

Many industries use automatic machines, especially robots, to perform repetitive tasks, work in dangerous environments or carry out operations requiring a degree of precision that cannot be achieved manually.

These robots and manipulators are already known, but are always used in fixed or semi-fixed positions. At most, they are mounted on guides which allow limited movements, generally between two given positions.

Automotive trucks are already known such as those which can automatically follow a number of tracks marked along the route and which can be programmed to decide independently which track to follow, depending on the task to be performed.

For example, some known trucks can follow a track consisting of an underground wire along which a signal travels, while others can optically detect a track drawn on the floor and move along the center of the track.

Such trucks are called AGV's, which is the abbreviation for automatically guided vehicles and this term will be used throughout the remainder of this description. However, robots and manipulators mounted on AGV trucks which can move for long distances along different routes in order to perform a given number of operations do not appear to be known.

There is a need for this kind of equipment in many industries, such as manufacturing industries and the like, but its construction presents numerous major problems.

For example, it is necessary to compensate for any unevenness in the flooring so that the robot can position itself with the required precision; another problem is the difficulty of constructing a robot which is compact enough to be mounted on an AGV of normal size while retaining all the necessary movements and precision.

SUMMARY OF THE INVENTION

In order to solve the above-listed problems, the present invention provides for a robot and automotive truck wherein the truck chassis adapts to uneven ground and the drive wheels are fitted to supports hinged to the chassis and subject to the action of elastic elements which press the wheels against the ground in order to ensure the necessary grip.

BRIEF DESCRIPTION OF THE DRAWINGS

This invention will now be described in detail, by way of example but not of limitation, with particular reference to the annexed figures in which.

DESCRIPTION OF THE PREFERRED EMBODIMENTS

Figure 1:
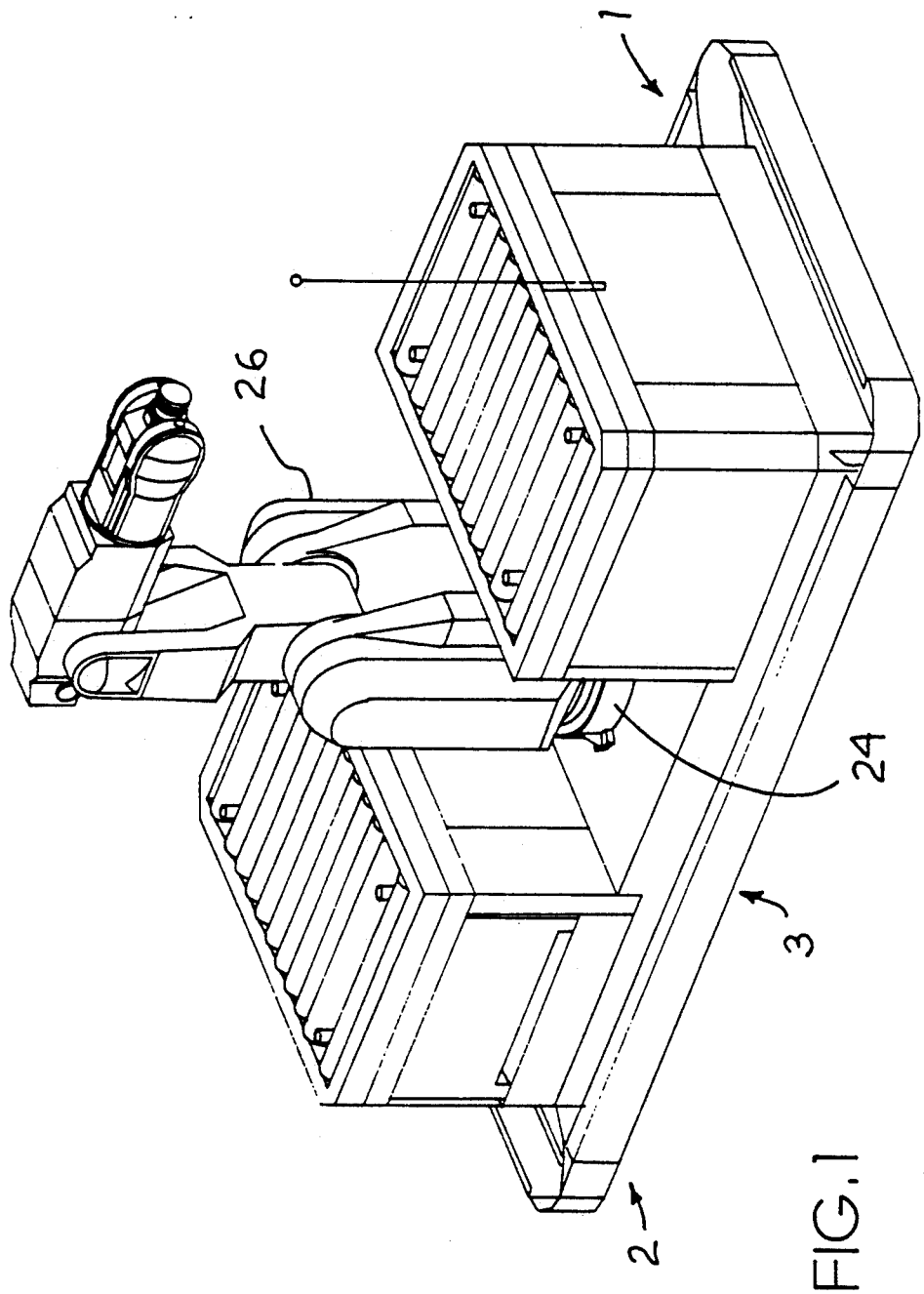
FIG. 1 is a perspective view of a robot mounted on a truck in accordance with the present invention.
Figure 2:
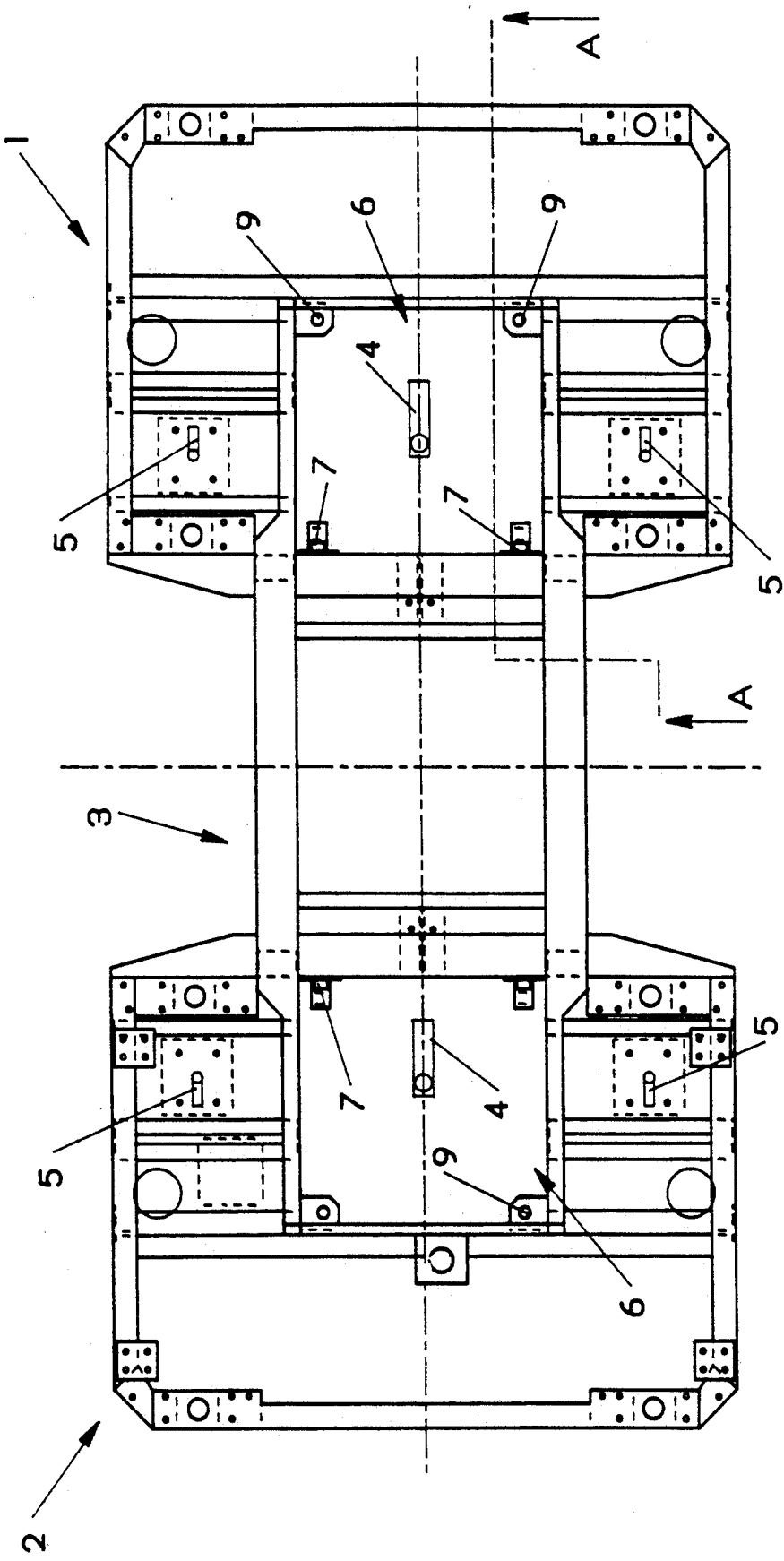
FIG. 2 is a bottom plan view of the chassis of FIG. 1.

FIG. 2 shows an AGV chassis having two areas marked 1 and 2 respectively for housing the robot's electronics and the battery unit, and are connected by a central section 3 on which the robot is mounted.

Central section 3 is narrower than the side sections in order to make the robot's arm more mobile.

The 6-wheeled chassis, made of welded steel sections or the like, is designed with very low torsional strength to ensure that each wheel rests firmly on the ground.

In particular, the chassis is designed so that an overload of some 100 kilos on one corner will lower it by approx. 1 cm due to torsion.

The wheels comprise a pair of drive wheels 4 located in a central position and two pairs of pivoting wheels 5 located at each drive wheel 4 such that a pivot wheel 5 is located on each side of the drive wheels 4.

Central wheels 4, which are power-driven wheels with brakes, are each fitted to a platform 6; this platform is hinged to the chassis at points 7 and from the opposite is subject to the action exerted by a pair of springs 8 (FIG. 3) on two tie-bars 9 hinged to the free edge of the plate 6.

Springs 8 are selected to present a low load variation during movements of the type performed by the plate 6 so that the load transmitted to the wheels 4 does not change to any great extent. To ensure that the wheels grip the ground sufficiently, the springs are selected so that most of the weight of the AGV (approx. 80-90%) is loaded onto the drive wheel 4.

However, this loading is calculated on the basis of the empty weight of the AGV.

If the load on the truck is increased, the inertial force opposing braking also increases, while the force pressing the drive wheels 4 and brakes against the ground, which is produced by the tension of spring 8, remains constant.

Figure 3:
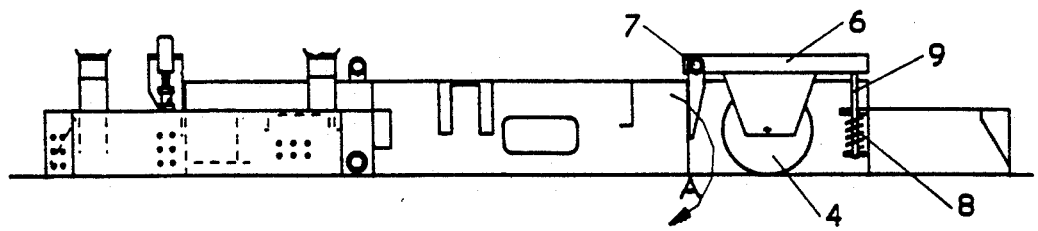
FIG. 3 is a view in cross-section taken along line A—A of FIG. 2.

The problem of braking the vehicle effectively then arises. For this purpose, the geometry of plate 6 is designed so that the resultant of the frictional force between wheel and floor and the force exerted by spring 8 does not pass through hinge point 7 but through a point located at a lower height, so that when the truck is braked, plate 6 tends to rotate in the direction of arrow A as shown in FIG. 3, exploiting the inertia of the braked mass to press the wheel even more firmly against the ground.

The fact that wheels connected directly to the motor and located in a central position can be effectively braked in this way eliminates the need to install motion transmission devices and twin braking circuits which would be necessary if lateral drive and/or braking wheels were fitted.

In the central area of the AGV there is a base 24 to which the body 26 of the robot is fitted on a thrust bearing 25.

A fixed crown wheel 27 is located in the central area of base 24. Via suitable gearing, a motor 28 activates a cogwheel 28 which engages crown wheel 27 to rotate the body of the robot around its own axis.

Precision gear 29, integral with crown wheel 27, engages a cogwheel 30 connected to a transducer such as an absolute encoder 31.

Below crown 27 there is a ring 32 with an arm 32' which projects into a groove 33 (FIG. 4) in the side of base 24. Ring 32 can consequently perform limited rotations around the axis of the base and the robot, the extent of which depends on the size of groove 33. The body of the robot is fitted with an arm or the like 34 which projects downwards, interfering with arm 32' of ring 32 during rotation of the robot.

Figure 8:
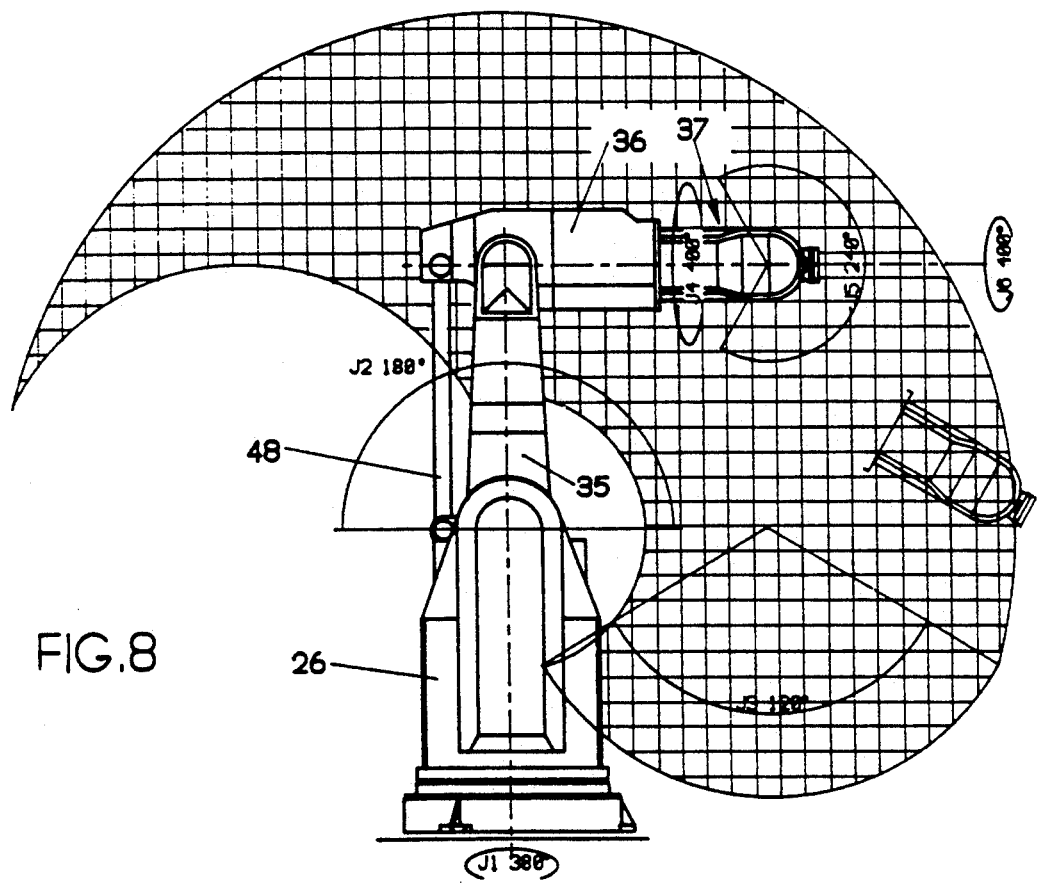
FIG. 8 is an illustration of the movements of the robot in accordance with the present invention.

Body 26 of the robot is equipped with a first arm 35 and a second arm 36 (FIG. 8) which is fitted with a toolhead 37.

A motor 38, located in base 24, controls the rotations of first arm 35 around its own axis; via a belt 39 the motor 38 rotates a first pulley 40 which is connected to arm 35 via a reducer 41.

Figure 6:
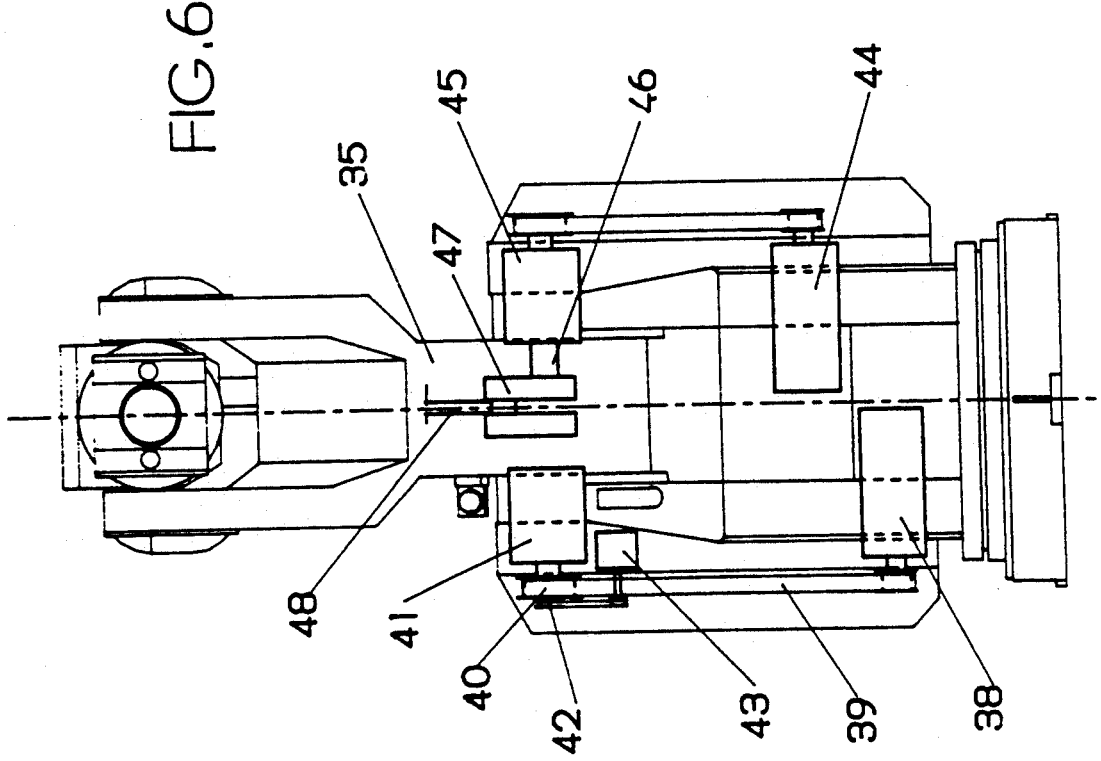
FIG. 6 is a front view of the robot of FIG. 1.

A second, smaller pulley 42, integral with the first pulley 40, is connected via a precision belt to the pulley of an encoder 43 (FIG. 6). A second motor 44 is connected in the same way to reduction gear 45 located on the opposite side of arm 35; this reduction gear activates a concentric pin 46 to which a crank 47 is fitted. A connecting rod 48 hinged to crank 47 (FIG. 6) transmits the motion to arm 36.

Head 37, fitted to arm 36, is able to rotate around the axis of that arm through more than 360°.

The problem which arises here is the wiring between the body of the robot and the head 37 with the accessories fitted to it, is that some 50–60 cables are generally connected to a head of this kind, and the problem is difficult to solve because the use of wiping contacts involves considerable wear problems, while a set of several dozen cables is too rigid and cumbersome.

According to the present invention, a pin 49 is connected to head 37 via a flange; when the head is fitted, this pin couples directly to reducer 50.

Pin 49 is hollow, at least close to the head connection.

Head 37 is fitted to arm 36 on bearings, while the set of cables 80, wound in a coil, is in turn coiled around pin 49.

The set of cables 80 is thus quite flexible, and allows any head movement without particular problems.

The set of cables 80 is then conveyed to head 37 through a hole in pin 49.

When in use, the truck on which the robot is mounted moves, guided in a known way, along the required routes.

The torsional flexibility of the chassis allows the truck to adapt to any unevenness in the flooring, always keeping all wheels in contact with the ground, while the drive wheels, fitted to plate 6 which is hinged to the chassis, are always pressed against the ground due to the effect of the force exerted by spring 8 via tie-bar 9.

When the truck is braked,, the resultant of the forces exerted on wheel 4 and the corresponding plate 6 make the plate tend to rotate downwards, pressing the wheel 4 still more firmly against the ground, thus exploiting the inertia of the truck to produce better adhesion of the braking wheel.

The truck can also be fitted with wedge-shaped telescopic elements which fit into matching housings located at the working areas in order to guarantee maximum precision of positioning whatever the condition of the ground surface.

In order to increase the flexibility of the machine the range of robot movement should be as wide as possible.

However, this requirement conflicts with the need to install mechanical travel limits which stop the movements of the machine if the electronic safety devices malfunction.

In known machines the presence of these mechanical limits restricts the rotations of the machine around the vertical axis to under 360°.

Figure 5:
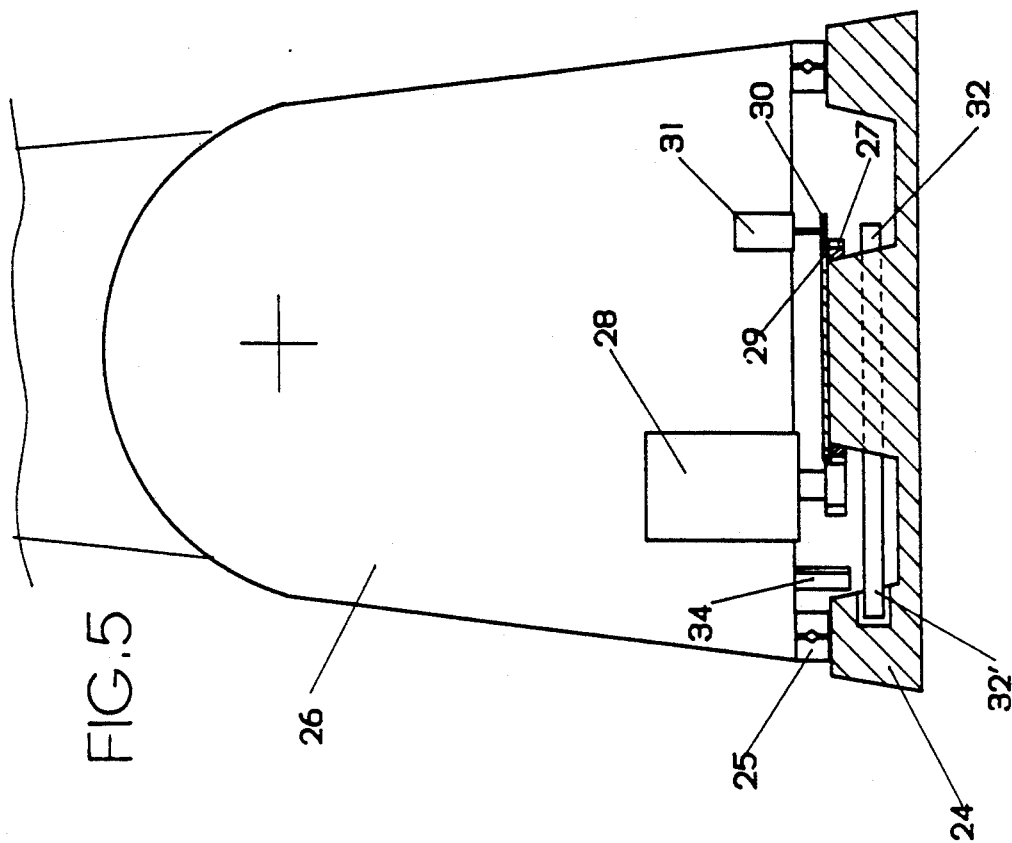
FIGS. 4 and 5 schematically illustrate a plan view and a view in vertical cross-section, respectively, of the base of the robot.
Figure 4:
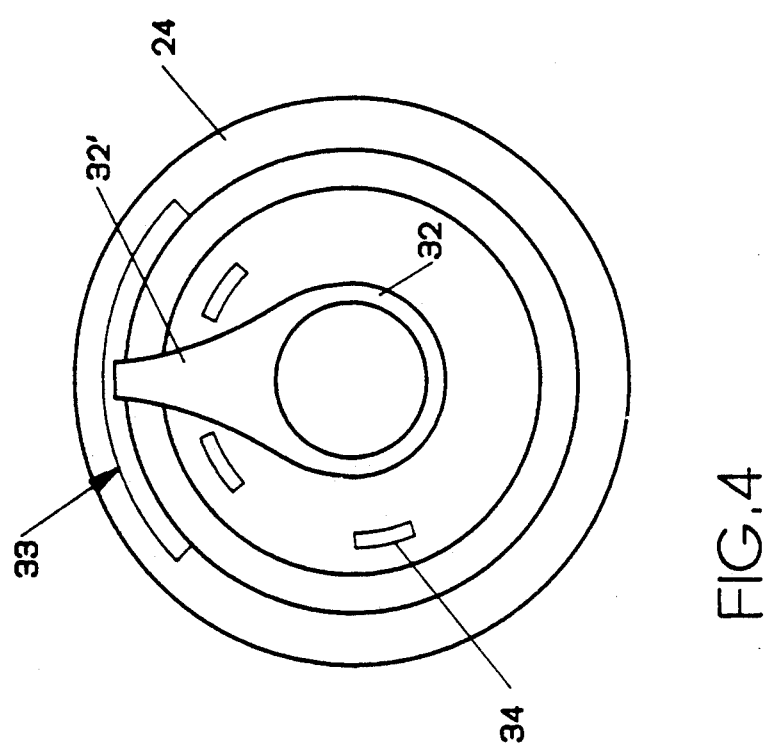
Figure 7:
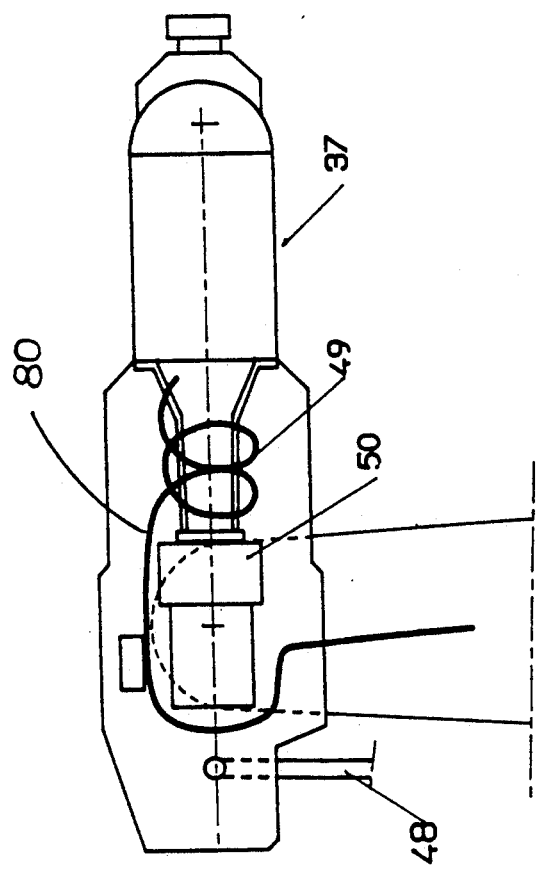
FIG. 7 is a schematic cross-section view of an end of a robot's arm.

In order to overcome this restriction, the robot in accordance with the invention is fitted with a travel limit, represented by arm 32', which can perform limited movements, thereby enabling the machine to rotate through more than 360° as illustrated in FIGS. 4 and 5.

Body 26 of the robot is mounted on base 24 which is engaged by a gear fitted to the shaft of motor 28.

This motor consequently controls the rotations of the robot around a vertical axis, these rotations being monitored by encoder 31 which engages fixed gear 29 via precision gear 30.

Arm 32' serves as mechanical travel limit for body 26.

When the body performs a complete rotation arm 32, pushed by pin 34, moves inside groove 33, allowing the body of the robot to continue its rotation before meeting the travel limit consisting of the end wall of groove 33.

As a result of this system the robot can be made to perform rotations exceeding 360° despite the presence of a mechanical safety travel limit.

The location of motors 38 and 44 (FIG. 6) and their reduction gears 41 and 45 means that the robot is very compact, allowing total mobility in a limited space with a consequent reduction in truck size.

The fact that the cables powering head 37 are wound together in a coil which in turn is coiled around the head support makes the assembly particularly flexible and produces maximum freedom of head movement.

An expert in the field could devise numerous modifications and variations which should be deemed to be included in the ambit of this invention.

We claim:

1. An automotive truck for a robot, the truck being able to move along an uneven surface, the truck comprising:
   a chassis having an upper surface;
   at least one platform movably mounted to the chassis;
   a drive wheel rotatably mounted to the platform;
   elastic means for pressing the drive wheel toward the surface;
   a robot having a base and a body rotatably mounted to the base, the base mounted on the upper surface of the chassis, the base having a central portion, the robot being rotatable about the base at least 360°; and
   motive means for rotating the robot, the motive means comprising a crown wheel mounted to the central portion of the base, a motor with cogwheel engaged to the crown wheel, a gear mounted at the central portion of the base and an encoder engaged with the gear.

2. The automotive truck according to claim 1, wherein the base has a groove in a perimeter of the base and the robot also including a limit arm rotatably mounted to the body, the limit arm having an end insertable into the groove of the base for permitting rotation of the limit arm in the groove.

3. The automotive truck according to claim 2, wherein the robot has a plurality of arms movably mounted to the robot, a pulley connected to each arm, a cog belt connected to each pulley, a base motor for each robot arm positioned in the base, the cog belts being connected to a base motor, and a robot encoder connected to each pulley.

4. The automotive truck according to claim 3, including a toolhead having at least one wire and a hollow pin connecting the toolhead and one of the robot arms, the hollow pin allowing the wire to pass from the toolhead into the robot arm.

* * * * *